United States Patent [19]
Rosa

[11] Patent Number: 5,210,685
[45] Date of Patent: May 11, 1993

[54] UNINTERRUPTIBLE POWER SUPPLY SYSTEM AND LOAD TRANSFER STATIC SWITCH FOR SUCH A SYSTEM

[75] Inventor: John Rosa, Penn Hills Twp., Allegheny County, Pa.

[73] Assignee: Westinghouse Electric Corp., Pittsburgh, Pa.

[21] Appl. No.: 709,880

[22] Filed: Mar. 8, 1985

[51] Int. Cl.[5] .................. H02H 9/00; H02H 7/122; H02J 9/06
[52] U.S. Cl. .................. 363/109; 307/66; 307/64
[58] Field of Search ............ 363/109; 307/66, 87, 307/64

[56]        References Cited
         U.S. PATENT DOCUMENTS

| | | | |
|---|---|---|---|
| 4,340,823 | 7/1982 | Miyazawa | 307/66 |
| 4,384,414 | 5/1983 | Crick et al. | 307/66 |
| 4,388,534 | 6/1983 | Love et al. | 307/66 |
| 4,510,401 | 4/1985 | Legoult | 307/66 |
| 4,528,457 | 7/1985 | Keefe et al. | 307/66 X |
| 4,553,039 | 11/1985 | Stifter | 307/66 |
| 4,560,887 | 12/1985 | Schneider | 307/66 |
| 4,562,357 | 12/1985 | Miyazawa | 307/66 |
| 4,564,767 | 1/1986 | Charych | 307/66 |
| 4,588,900 | 5/1986 | Honjo | 307/66 |
| 4,604,530 | 8/1986 | Shibuya | 307/66 |
| 4,634,888 | 1/1987 | Deavenport | 307/66 X |
| 4,665,322 | 5/1987 | Eishima et al. | 307/66 |
| 4,667,116 | 5/1987 | Honjo et al. | 307/64 |
| 4,673,825 | 6/1987 | Raddi et al. | 307/66 |
| 4,692,632 | 9/1987 | Gaul et al. | 307/66 |
| 4,788,451 | 11/1988 | Stoet | 307/66 |

OTHER PUBLICATIONS

UPS Solution to Powerline Problems, by D. J. Becker and R. J. Plow, *Telephony*, Oct. 18, 1982, pp. 34, 37, 40 and 44.
Inverters for Uninterruptible Power Supplies, by G. N. Revankar and S. M. Sriraghavan, *J. Instn Electronics & Telecom Engrs.*, vol. 28, No. 8, 1982, pp. 414-423.

*Primary Examiner*—John B. Sotomayor
*Attorney, Agent, or Firm*—M. J. Moran

[57]                ABSTRACT

A UPS system which operates initially in a commutation mode allowing commutation of the static transfer switch provided on the primary supply lines, and wherein the standby source is kept energized so as to operate to commutate such transfer switch through the inverter just before initiating UPS mode of operation.

16 Claims, 8 Drawing Sheets

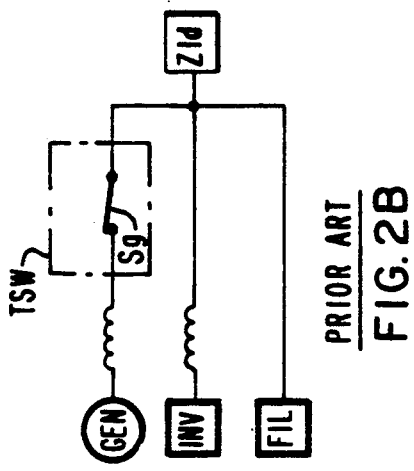
FIG.2B PRIOR ART
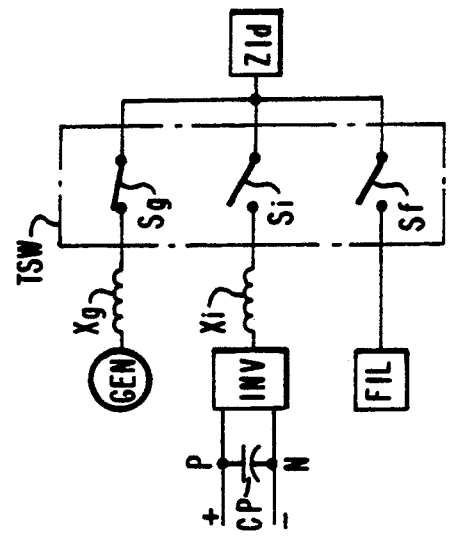
FIG.2E
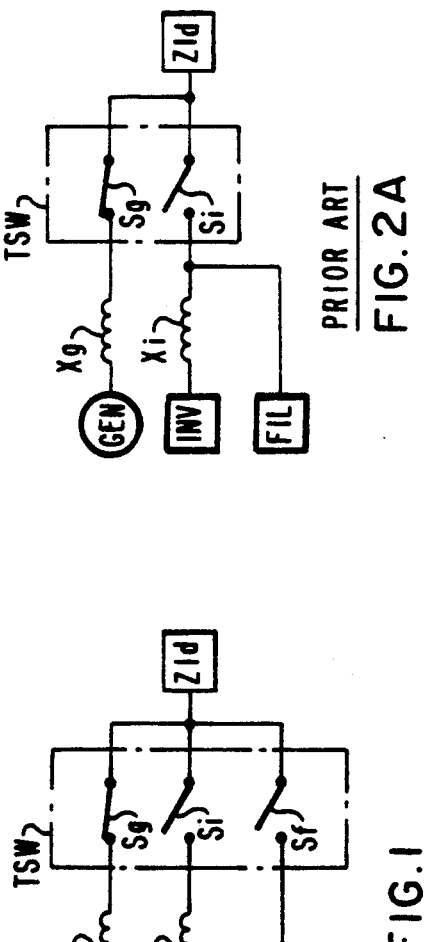
FIG.2A PRIOR ART
FIG.1
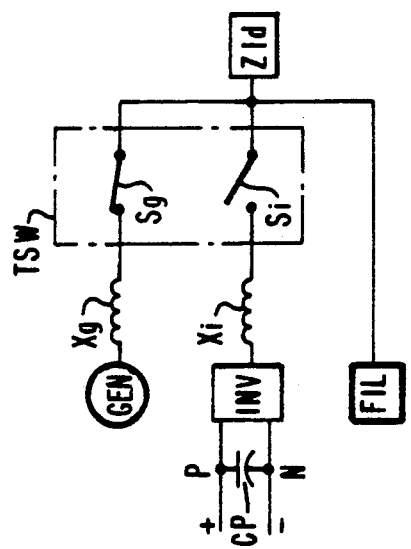
FIG.2D
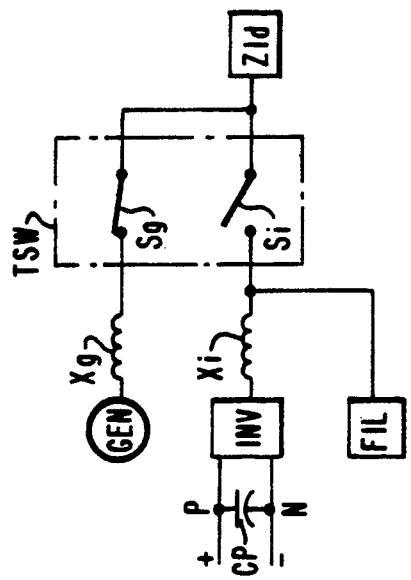
FIG.2C

UNINTERRUPTIBLE POWER SUPPLY SYSTEM AND LOAD TRANSFER STATIC SWITCH FOR SUCH A SYSTEM

BACKGROUND OF THE INVENTION

The invention relates to static power systems in general, and more particularly to uninterruptible power systems (UPS) such as used on aircraft, for computer systems, or wherever a source of proper nature, voltage and/or frequency might become disrupted and when continuity of source is essential.

The function of a UPS system is to supply electrical power to certain critical loads when the main source of electrical power fails. Therefore, UPS systems usually spend most of their useful life standing by, waiting to supply power on an instant's notice. Hence, power consumption in standby is an important consideration. For many applications the continuity of power is of vital importance. Disruptions exceeding a fraction of an AC cycle cannot be tolerated. In addition, in many cases the quality of the output voltage provided by the UPS system is required to be comparable to that of the primary power system. Only minor impairments in voltage quality are tolerated immediately after load transfer to UPS supply. Moreover, under steady state operation it is required to filter out any voltage distortions caused by the UPS power circuit, and to provide a low output impedance path for the harmonic components of the load current such as drawn by rectifiers which is rich in harmonics.

Due to the usually low source impedance provided by the primary electrical system, the transfer switch contacts connecting the load to the electrical system are subject to large fault currents. An important consideration is to design these contacts with a high fault current rating without, however, adversely affecting the speed of the transfer or the cost of this portion of the UPS system.

The invention pertains to load transfer from the primary AC power system to operation under the standby source of a UPS system.

Load transfer is effected with a transfer switch apparatus for coupling the load to either the primary AC power supply or the UPS system. The latter consists of a DC to AC inverter system fed from a standby DC source, typically a battery. A UPS system generally also includes a harmonic filter which needs to be connected as a bypass to the primary AC power supply line, once the harmonic generating inverter is in operation with the load.

The object of the present invention is to provide minimal power consumption in the UPS system when in the standby mode.

Another purpose of the invention is to allow a fast load transfer in a UPS system which is compatible with minimal interruption of the load power supply.

The invention further affords in a UPS system, the generation immediately upon transfer to the standby source, of a good quality inverter output voltage with the standby source in operation.

SUMMARY OF THE INVENTION

The invention resides in transfer switch apparatus for a UPS system which is controlled for effecting switching into operation of an inverter permanently coupled to a standby DC source. The output of the inverter is also permanently coupled to the AC load, whereas the primary AC power supply of the AC load is connected thereto through a generator static switch which is part of the transfer switch according to the invention.

More specifically, upon load transfer into the UPS mode, namely from the normal primary AC power supply to the standby source through the inverter, the generator static switch of the primary AC power supply is disabled, and a commutating voltage is applied through the switches of the inverter and the output thereof to the generator static switch for natural commutation thereof. Still specifically, the standby DC source is applied by the inverter as a commutation voltage to the generator static switch of the primary AC power supply. In other words, the transfer switch of the UPS system includes both the generator static switch of the primary AC power supply and the power switches of the inverter. After a predetermined time delay sufficient to assure commutation of the static switch of the primary AC power supply, the inverter is gated normally for operation in the UPS relief mode with the load. The transfer switch apparatus according to the invention also provides for the insertion of an harmonic filter to provide a low output impedance bypass for the harmonic components of the load currents.

BRIEF DESCRIPTION OF THE DRAWINGS

FIG. 1 shows conceptually on a single pole basis the basic elements for load transfer of a UPS system;

FIGS. 2A and 2B show two prior art schemes for the transfer of power in a dynamic standby situation;

FIGS. 2C, 2D and 2E show three possible transfer schemes in a static standby mode as applicable in a UPS system according to the invention;

DESCRIPTION OF THE PREFERRED EMBODIMENT

Figure 3:
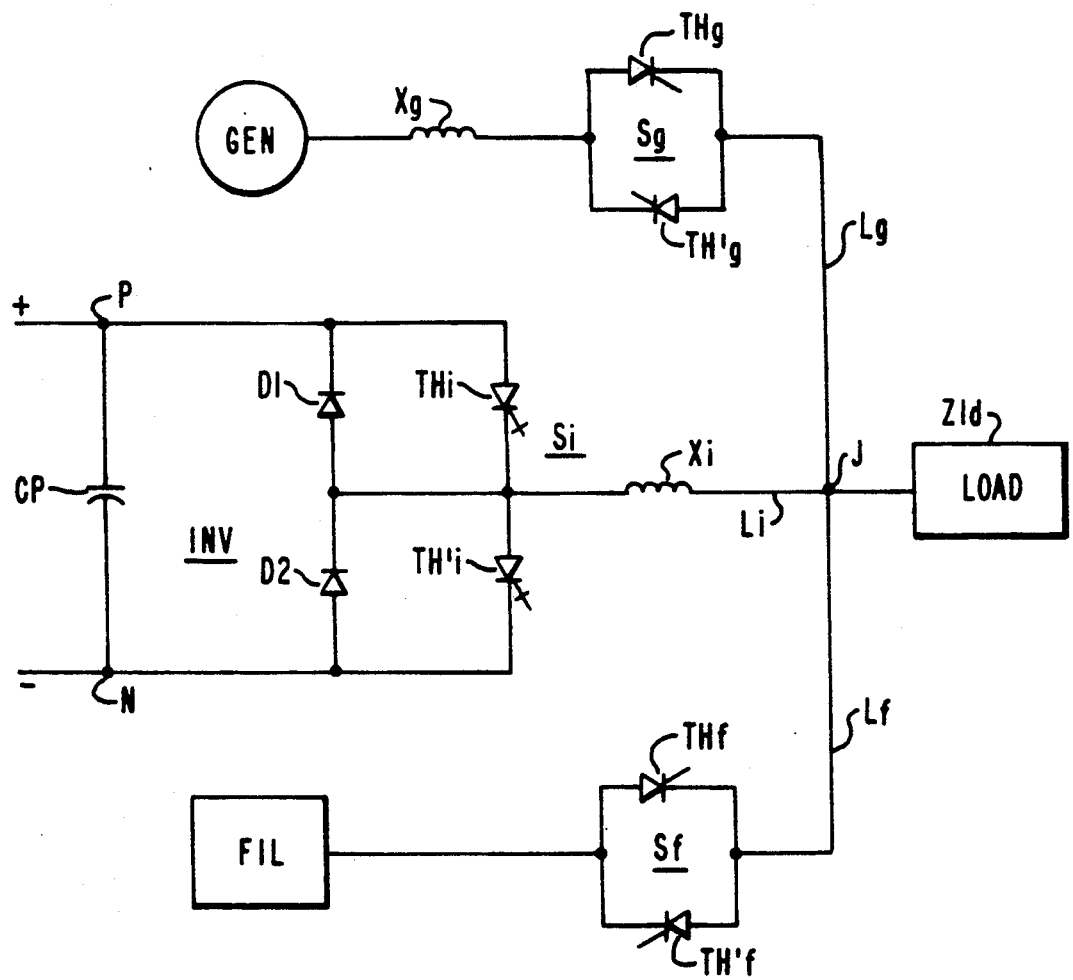
FIG. 3 shows in a single-pole line diagram the transfer switch according to the present invention for providing improved transfer from primary power to standby power for an AC load.

It is assumed that the standby source used, when the UPS system is to be transferred to the UPS mode, is a battery permitting load transfer without delay. The DC power of the battery is converted to AC power by a solid state inverter. Preferably, associated with the inverter output is a filter to reduce the voltage harmonics generated by the inverter and to provide a low impedance bypass to harmonic currents drawn by the load.

The primary AC power supply is referred to herewith as the "generator" in order to parallel the standby source. The AC generator is connected to the AC load through contacts which pertain to a static transfer switch. Hereinafter, these static contacts will be seen as part of a "generator static switch". It is understood that while the invention is hereinafter described in the context of a 3-phase AC power system the description is also valid for single phase systems.

Consideration should be had first to the load transfer scheme involved in a UPS system. The essential parts participating in load transfer from the "generator" or primary AC power supply to the UPS system proper are: the transfer switch, the inverter and the harmonic filter. The subsystems existing on the DC side of the inverter are hereinafter represented for the purpose of this description by the DC link filter capacitor CP present at the input of the inverter. Accordingly, the voltage $V_{DC}$ across said capacitor will be referred to as the DC link voltage.

Referring to FIG. 1, the basic transfer mechanism is schematically illustrated by a single-line diagram. Mainly, the static transfer switch TSW has three sets of three-phase contacts Sg, Si and Sf. Contacts Sg connect the AC load Zld to the primary AC power system designated as the "generator" GEN. The reactance Xg existing between contacts Sg and generator GEN represents the impedance of the AC source.

The contact set Si connects the AC load to the inverter INV. The reactance Xi existing between contacts Si and inverter INV represents the inverter output reactances. These include any existing transformer reactances. The set of contacts Sf connects the harmonic filter to the supply line of the load when the latter is fed from the inverter. There are two possible modes of operation during standby, depending upon whether the required DC link voltage is present at the input of the inverter, or not. When such required DC link voltage is not present, the UPS system is said to be in a "de-energized" standby mode. Otherwise, it will be in an "energized" standby mode. Since in the "de-energized" standby mode the UPS power circuit is completely de-energized, the filter capacitor CP at the input of the inverter has no charge. Clearly, such mode of operation cannot provide load transfer with the speed required for a high quality UPS system.

Considering now the "energized" standby mode, this approach will keep the DC link continuously energized during standby, whereby the DC link filter capacitor will be held charged to the required DC link voltage for the inverter. In such "energized" standby mode, there exist two variants: the dynamic standby (illustrated by FIGS. 2A, 2B) and the static standby (illustrated by FIGS. 2C, 2D, and 2E).

In the "dynamic" standby mode the system is fully operational, that is, the inverter is continuously energized, as well as the DC link during standby. Therefore, the inverter switches are working during standby. This is prior art. This approach is illustrated by FIGS. 2A, 2B. The transfer switch TSW has contacts Sg for switching in the primary AC power supply and contacts Si for switching in the inverter output (and, as illustrated, for also switching an associated filter FIL). In the case of FIG. 2A, these switches alternatively switch onto the load sources which are constantly available. FIG. 2B shows a transfer switch TSW having only contacts Sg for the primary AC source, so that the output of the inverter (and of the associated filter FIL) is constantly connected with the load. In this case, the inverter constitutes a parallel AC source which is alive but controlled so as not to deliver real power until switch contacts Sg effectively disconnect the primary AC source from the load.

In accordance with the present invention, instead of the "dynamic" standby mode of FIGS. 2A, 2B, a "static" standby mode is proposed as illustrated by FIGS. 2C, 2D and 2E. The required DC link voltage is at all times applied to the input of the inverter, since the DC link filter capacitor CP is fully charged. In the implementation of contacts Sg, Si and Sf of the transfer switch TSW it is proposed according to the invention to use separate static power switches controlled independently as parts of the transfer switch. In contrast to the "dynamic" standby mode, here the semiconductor switches of the inverter are not being gated and are blocking. However, they are ready to be gated and provide an AC output voltage whenever required on an instant's notice.

FIG. 2C shows the harmonic filter FIL permanently connected to the output of the inverter, but such output is disconnected from the load by contacts Si, when contacts Sg between the generator and the load are closed. FIG. 2D illustrates the case when the harmonic filter FIL is permanently connected to the load behind both contacts Si and Sg. FIG. 2E shows separate contacts Sg, Si and Sf in the transfer switch TSW: one set for the generator, one for the inverter and one for the filter.

FIGS. 2C, 2D and 2E call for the following considerations:

A set of contacts Si is shown within the transfer switch TSW in all three instances. According to the present invention, however, the power switches of the inverter become operative at the initiation of load transfer. It also appears that in the instance of FIGS. 2D and 2E the inverter switches can function as contacts Si of the transfer switch TSW.

The scheme of FIG. 2E constitutes the preferred embodiment for the following reasons.

On FIGS. 2A–2E, the heavy lines indicate those parts of the circuit which are operational during standby.

With FIG. 2C, during standby, generator switch Sg is closed and inverter switch Si is open. When load transfer is required, contacts Sg of the generator switch are opened and the inverter switch Si is closed, the inverter being activated. The main drawback here is that the filter is likely to take heavy inrush currents which result in overloads on the inverter and can cause large voltage transients immediately subsequent to load transfer.

The scheme of FIG. 2D avoids this by leaving the filter permanently energized (even during standby). This approach, though, presents two shortcomings: (i) The harmonic filter usually draws a significant leading reactive power. This is undesirable in a standby mode since it represents VAR's added to the system. (ii) The filter components interacting with other impedances in the system "upstream" from the transfer switch may have undesirable resonant frequencies for which minor voltage disturbances may get amplified. Since the "upstream" impedances vary from case to case and are also affected by the given load served, it is very difficult to provide a harmonic filter design which copes with such eventuality.

The scheme of FIG. 2E avoids the filter inrush problem by properly delaying energization of the filter phases until the zero-crossing of the respective voltages occurs. This means that the maximum delays for connecting the filter phases are 60°, 120° and 180°, respectively, assuming that the filter branches are line-to-line (i.e. delta) connected. At the very latest, namely at 120° (i.e. in less than ⅓ cycle) the filter configuration becomes an "open delta" which provides filtering to all three lines. It has also been proven that, with this approach and the use of complementary techniques discussed hereinafter, a good quality voltage waveform can be obtained subsequent to load transfer.

An important feature of the scheme of FIG. 2E is that at the moment of transfer the inverter output voltage can be instantly brought up to either polarity of the DC source. This makes it possible to use thyristors in the implementation of the set of contacts Sg of the generator switch, thereby providing a large fault override capability.

In contrast, FIG. 2A shows the system operating on an "OFF-line" dynamic standby mode. The filter is permanently connected to the inverter. On standby, contacts Si are open, but the inverter is fully operational and synchronized to the AC lines. If load transfer is required, contacts Si are closed and contacts Sg are opened. Therefore, this system requires to use power semiconductors with turn-off ability (GTO, transistor) or force commutated thyristors in order to implement contacts Sg. This is not the case with the scheme of FIG. 2E.

FIG. 2B shows a system operating on an "ON-line" dynamic standby mode. The inverter INV and filter networks FIL are permanently connected to the AC lines. During normal operation, control is provided to maintain the proper phase angle and amplitude for the inverter output voltage so as to obtain the desired real and reactive power flow. The parallel filter elements appear as capacitors at the fundamental frequency. This can be compensated for, if required, by controlling the inverter to draw an equal amount of lagging current. If load transfer is required, contacts Sg are opened to isolate the generator. Again, power semiconductors with turn-off ability must be used to implement contacts Sg. Moreover, the problem of filter resonance with "upstream" reactances earlier mentioned in relation to the scheme of FIG. 2D, exists here too.

The UPS system is expected to spend only a small fraction of its projected life providing with the standby source power to the load. The remaining time is spent in the "standby" mode, being ready to provide power on a few microsecond notice. Thus, selecting an inactive system in standby is very attractive from the point of view of energy consumption, provided requirements concerning speed and quality of load transfer can be met.

A simple numerical example can show how inefficient the operation in the dynamic standby mode can be. Assuming that a 250 kVA UPS system spends 300 days/year in standby, there are 6% standby losses and 24 full power runs/year (two per month), of 3 minutes each, which duration usually gives sufficient time to start up a rotating generating set if longer power outage is on hand. The total energy delivered by such a UPS system to the load, then, is 300 kWhr/year, while it burns up 108,000 kWhr/year in standby losses, or 360 times the useful energy it provides.

The implementation of the inverter switch contacts used as the set of contacts Si of FIG. 2E, according to the preferred embodiment of the invention, rests upon the following considerations:

First, since in the chosen "static" standby mode the inverter pole switches are not conducting, there is no need for a separate set of inverter switch contacts. Upon the instant that load transfer is required, the inverter pole switches receive appropriate gate signals and the inverter is automatically switched onto the line. Such simple procedure eliminates the need at the output of the inverter of a separate three-phase set of switches with associated gating and control. It is, therefore, proposed, according to the invention, to use the inverter pole switches as part of the transfer switch TSW.

Referring to FIG. 3, a side benefit is that, during standby, the line voltages charge the DC link capacitor CP, via the reverse current diodes D1, D2 of the inverter poles (THi, TH'i in FIG. 3 for the switches of one pole), to the peak line-to-line voltage, thus keeping the DC link capacitor pre-charged, without additional circuitry, as would be the case for a static standby scheme.

The implementation of the inverter switch contacts Si is illustrated by GTO switches THi, TH'i in FIG. 3, for a single inverter pole in a single line diagram. The specific inverter circuit configuration (e.g. the absence or presence of output transformers) does not affect the description of the invention, provided the concepts given hereinafter are respected.

Considering now the implementation of the harmonic filter switch contacts Sf, it is observed that in the static standby mode the harmonic filter FIL ideally should be de-energized and upon load transfer, the inverter INV whereas, the filter FIL should be simultaneously connected to the AC lines. This, however, raises the possibility of large inrush currents into the harmonic filter capacitors (CAB, CBC, CCA in FIG. 4). To avoid this, solid state switches for contacts Sf are necessary in order to permit proper timing of filter energization.

One simple solution herein proposed is to use a reverse parallel thyristor pair, or a triac, applied in series with each line-to-line connected harmonic filter branch. Such static switches for contacts Sf are gated ON subsequently to load transfer, but as soon as their respective fundamental inverter line-to-line voltages cross zero. Thereafter, the gating signals for the harmonic filter static switch are maintained ON until the load can be re-transferred to the primary AC power system. The implementation of the harmonic filter switch contacts Sf is illustrated by thyristors THf, TH'f in FIG. 3.

In a second approach, rather than relying on the zero-crossing occurrence, the harmonic filter capacitors are charged to the peak line-to-line voltage (polarity is arbitrary) and the switches of the harmonic filter switch Sf are closed when the corresponding line-to-line voltage reaches peak value for the first time after load transfer. The main drawback, though, is that it may take twice as much time (240°) to provide filtering for all three phases than it would with the first approach (only 120° at most). Another drawback is that the harmonic filter capacitors are exposed to voltage stress during standby.

The implementation of generator switch contacts Sg will be now considered: The function of contacts Sg is to disconnect the generator (primary power system)

from the UPS system and from the load once the load has been transferred to the UPS mode. Since load transfer could be called upon as a result of short-circuit "upstream" from Sg, the generator switch Sg must be turned OFF without delay, thereby to prevent the UPS system from feeding current into the fault. Indeed the UPS system could be equipped with a current limiter which would prevent such destructive overcurrent, but this would impose to reduce the inverter voltage in order to limit the fault current and, thus, an undesirable undervoltage condition would exist until contacts Sg are effectively turned OFF. Such undervoltage condition could constitute an objectionable discontinuity of power.

In order to facilitate fast turn-off, the Sg contacts of the generator switch must be solid state switches. The three switch phases can be operated independent from one another. They need not be ganged together as would be with ordinary mechanical switches. Depending on the particular semiconductor device selected, and on possible additional circuitry, the "contacts" Sg may be operated in one of two ways, as follows:

(a) As "ideal, non-arcing contacts" which upon opening instantly interrupt current flow. In solid state terminology this is called "forced commutation". In accordance with "forced commutation", the connection between load and generator is severed and load transfer is completed with virtually no delay after load transfer has been initiated.

(b) As "arcing mechanical contacts" which upon opening draw an arc and cease to conduct only after the current crosses zero. In solid state terminology this is called "natural commutation". In accordance with "natural commutation", connection between load and generator is severed and load transfer is completed with some delay following load transfer initiation. The mode of switch commutation opted for (i) conditions the type of power semiconductor to be used; and (ii) imposes specific requirements on the inverter control.

Consideration will be given first to the "forced-commutation" switch commutation mode:

(i) To implement "forced commutation", semiconductor switches with turn-off ability (GTO, transistor) or thyristors with auxiliary force commutation circuit must be used whereas if the switches are operated with "natural commutation", thyristors can be used.

(ii) With "forced commutation" at load transfer, current flow from the generator through the switch is instantly interrupted by the semiconductor switch "contact". This is a favorable factor. Current flow in the source reactance and in the inductive load, however, cannot be stopped instantly, and the current in the inverter output reactance cannot be stepped up instantly. In order to avoid destructive overvoltages, a voltage clamp must be provided, on both sides of the generator switch, which temporarily provides a path for the source current until the energy in the source reactance is dissipated and to the load current until the inverter current reaches the level of load current. During this time the output voltage assumes the value of the clamp voltage.

Considering now the "natural commutation" switch commutation mode initiated at load transfer, current flow from the AC primary power supply through the generator switch is decaying to zero due to the natural commutation circuit action. Once the current through the generator witch GNS has decreased to zero, the switch therein reverts to a blocking mode, acting as an open switch. A usual natural commutation circuit action in bringing the current to zero is the one obtained by cyclic reversal of the AC generator voltage. For fast load transfer to the UPS mode as required with a UPS system, however, such action cannot be relied upon since it depends on the desired instant of transfer. Moreover, voltage reversal may take more than 90°, whereas decay of the current in the generator switch might take, in most case, 180°. Should, due to a fault, the generator voltage collapse, voltage reversal will not take place at all and current delay may take even longer. Therefore, to cope with fast load transfer, in accordance with the present invention, a preferred implementation is to provide a fast decrease to zero of the currents through the generator switch contacts by bringing up the inverter voltage with proper polarity to oppose and reduce to zero the current flow from the generator. To accomplish this, the inverter power circuit must have the ability, and the inverter control circuit must have the "intelligence", to start up the inverter poles with the proper polarity. This requires that each inverter pole produce a voltage of such polarity that it is in opposition to the existing current flow of a given polarity from the primary AC power supply for the corresponding phase. This polarity must be maintained for a sufficiently long time (typically, 100 microseconds) after the current from the generator has been reduced to zero, in order to provide reverse bias for recovery of the thyristors of the generator switch. The natural commutation process does not interfere with the current flowing in an inductive load and hence no clamping is required. The duration of the commutation process depends upon the instantaneous value of the load current, the value of the inverter output inductance and the source inductance. A typical maximum value is 150 microseconds in a 60 Hz system.

Load transfer with "natural commutation", using thyristors has several advantages when compared with "forced commutation":

(i) On a "one-on-one" basis, thyristors and their auxiliaries (gating and snubber circuits, etc.) are less expensive than GTO's and transistors.

(ii) The transfer switch implemented with thyristors is much simpler than the force commutated version, because GTO's and transistors need complex clamp circuits for the reasons outlined above and additional diodes for reverse voltage support.

(iii) Thyristors have higher fault current rating. The invention has been proved to work with a 250 kVA, 440V, 3-phase UPS system, using a conventional 3-phase bridge inverter controlled by pulse-width modulation (PWM) to reduce the harmonic distortion of its output voltage. A fixed PWM pattern, consisting of four notches per half cycle, has been applied to eliminate the 5th, 7th, 11th and 13th harmonic of the output voltage. The load is 1 p.u., 0.8 PF. To improve voltage quality subsequent to transfer, the pulse-width-modulation is not started until after the first filter branch is connected, namely at instant $t_f$ (30°). It has been shown that such load transfer method virtually eliminates power disruption. Even with a primitive 3-phase bridge circuit, the quality of output voltage subsequent to transfer is quite reasonable. Better quality can be achieved with more complex inverter circuitry.

A static generator switch, which upon load transfer according to the present invention is inverter commutated, is achieved with inverter power circuits operating in a static standby mode. This is done under "natural commutation" for the generator switch, complete load transfer being effective within a fraction of a cycle. Systems operating in dynamic standby do not have this ability, since they cannot suddenly adjust the polarity of their output voltages because of the presence of the filter. Consequently, they would have to use a force commutated generator switch to accomplish load transfer at a comparable speed.

Due to the usually low source impedance of the electrical system, the transfer switch contacts connecting the load to the primary electrical system are subject to large fault currents. An important design consideration is to design these contacts with high fault current rating without, however, adversely affecting the speed of operation and cost of this part of the UPS system. The inverter commutated generator switch contacts of the transfer switch according to the invention can be implemented with thyristors that are available with very large short term surge current ratings. Even higher fault current ability can be attained with thyristors mounted in parallel. These ratings cannot be matched with switches having turn-off ability without becoming much more costly, if not outright prohibitive.

Figure 4:
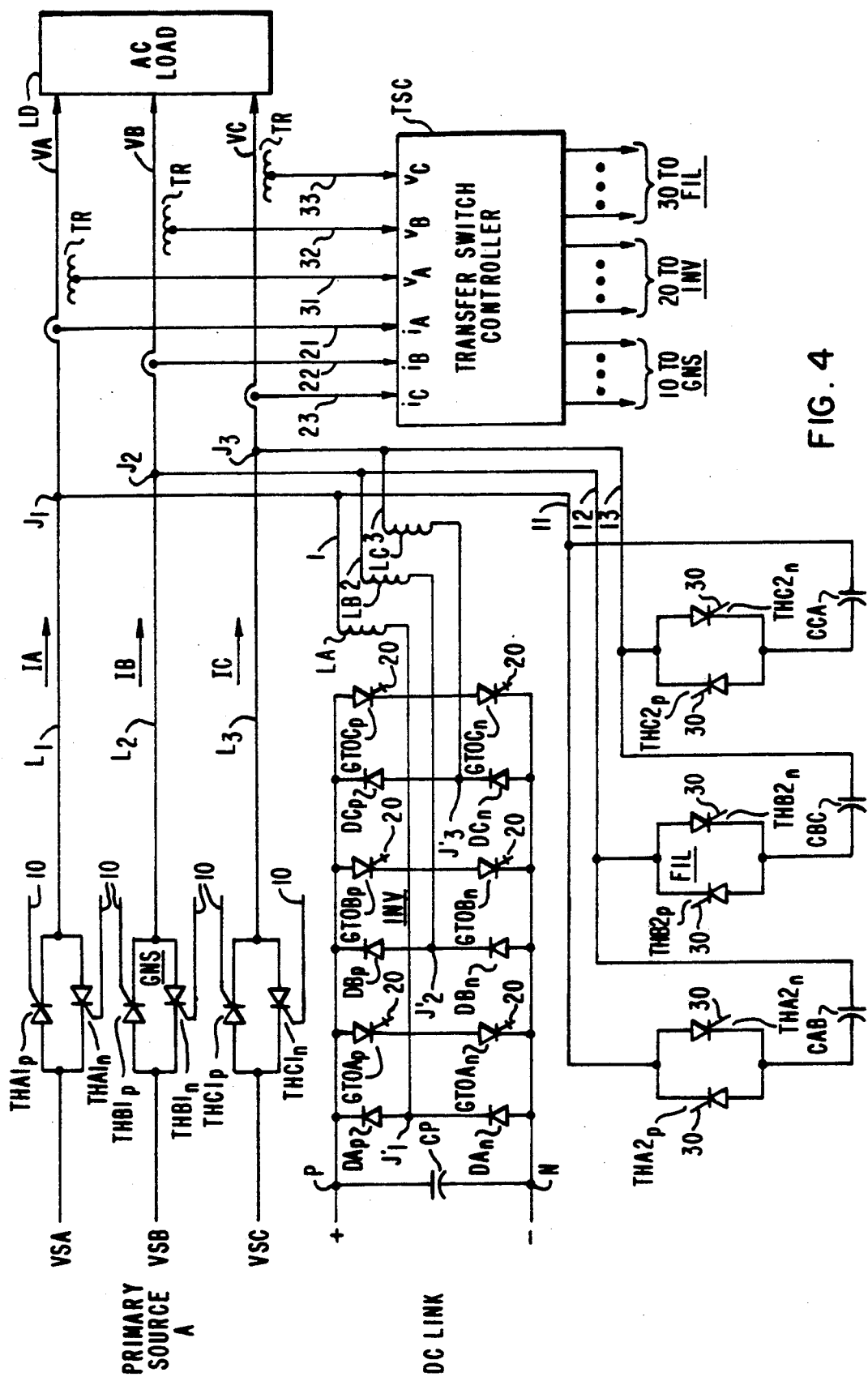
FIG. 4 shows the circuitry according to an embodiment of the invention, namely through the use of a transfer switch controller for controlling the generator, the inverter and the filter portions of the transfer switch.

Referring to FIG. 4, the transfer switch according to the invention is shown in its preferred implementation to include:

1) a generator switch GNS comprised of antiparallel thyristors (THA1$_p$, THA1$_n$) for phase A and the respective two polarities, (THB1$_p$, THB1$_n$) for phase B and (THC1$_p$, THC1$_n$) for phase C. On the phase lines L$_1$, L$_2$, L$_3$ from the primary AC power source to the load LD;

2) The inverter illustratively includes GTO switches (GTOA$_p$, GTOA$_n$), which are connected in series across the DC link of the inverter INV, for phase A at the nodal point thereof, GTO switches (GTOB$_p$, GTOB$_n$) for phase B, and GTO switches (GTOC$_p$, GTOC$_n$) for phase C, at the output of the inverter;

3) The harmonic filter FIL includes, typically, thyristor switches (THA2$_p$, THA2$_n$) connected in antiparallel for the respective polarities between phases A and B, or lines L$_1$, L$_2$ to the load LD, thyristor switches (THB2$_p$, THB2$_n$) between lines L$_2$, L$_3$, or phases B and C and thyristor switches (THC2$_p$, THC2$_n$) between lines L$_3$, L$_1$, or phases C and A.

The primary source is a three-phase AC source of voltages VSA, VSB, VSC supplying phase current IA, IB, IC, when the generator switch is gated for conduction, which results in voltages VA, VB, BC at the input of the load. Load transfer to the standby source of the UPS is commanded by a transfer switch controller TSC, whenever a serious discrepancy amounting to an imminent interruption appears between the voltages VSA, VSB, VSC of the primary source. This situation is ascertained from sensing voltages VA, VB, VC behind the generator switch GNS. Such critical event is detected within the transfer switch controller TSC from a consideration of the sensed voltages VA, VB, VC and the sensed currents IA, IB, IC flowing in lines L$_1$, L$_2$, L$_3$ after the generator switch GNS. The voltages VA, VB, VC sensed through a transformer TR for the respective phases are inputted via lines 31–33 into the transfer switch controller TSC. The sensed currents IA, IB, IC are similarly inputted via lines 21–23 into controller TSC.

Figure 5A:
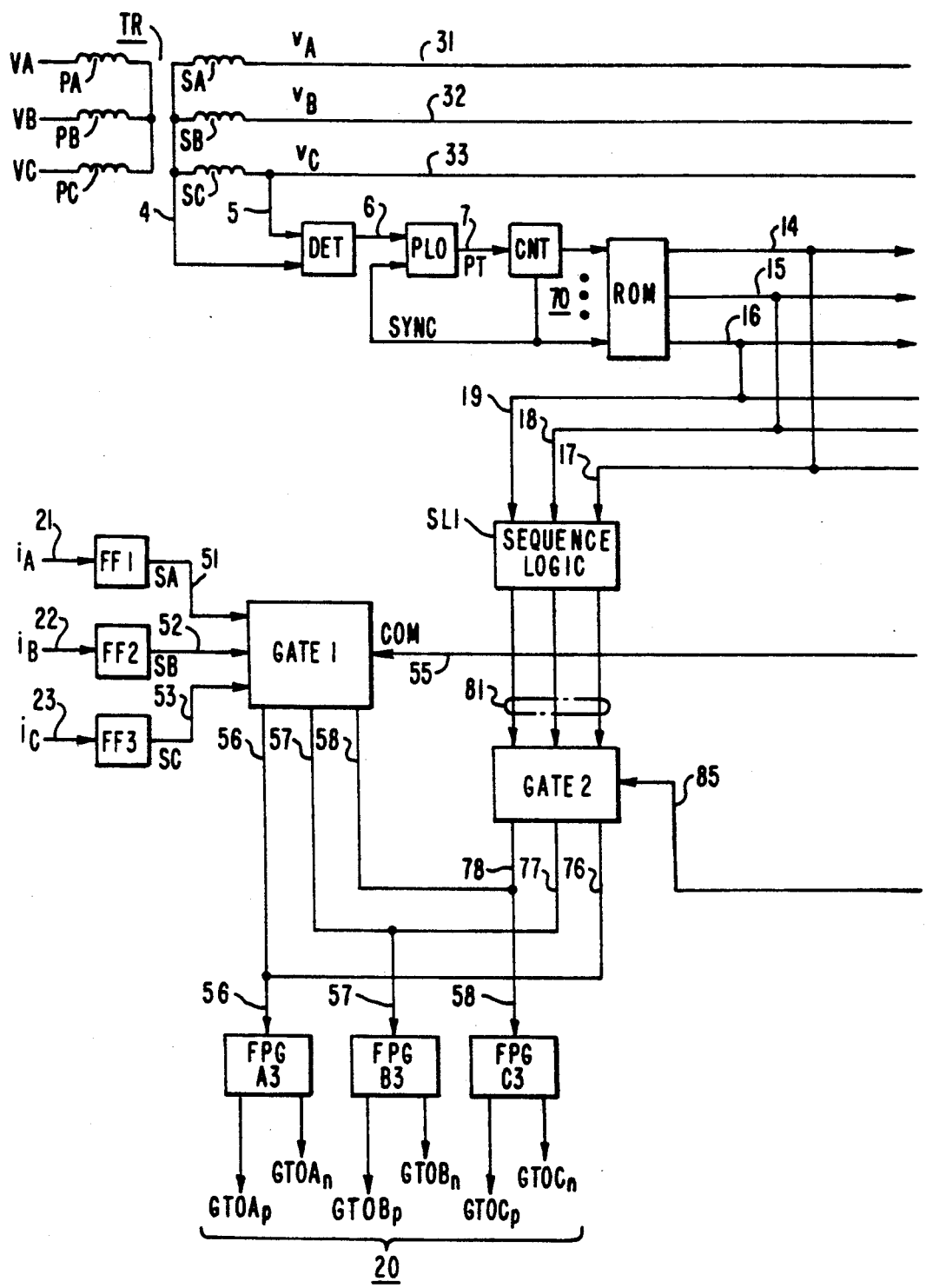
FIGS. 5A and 5B illustrate with more detail the implementation of the transfer switch controller of FIG. 4.
Figure 5B:
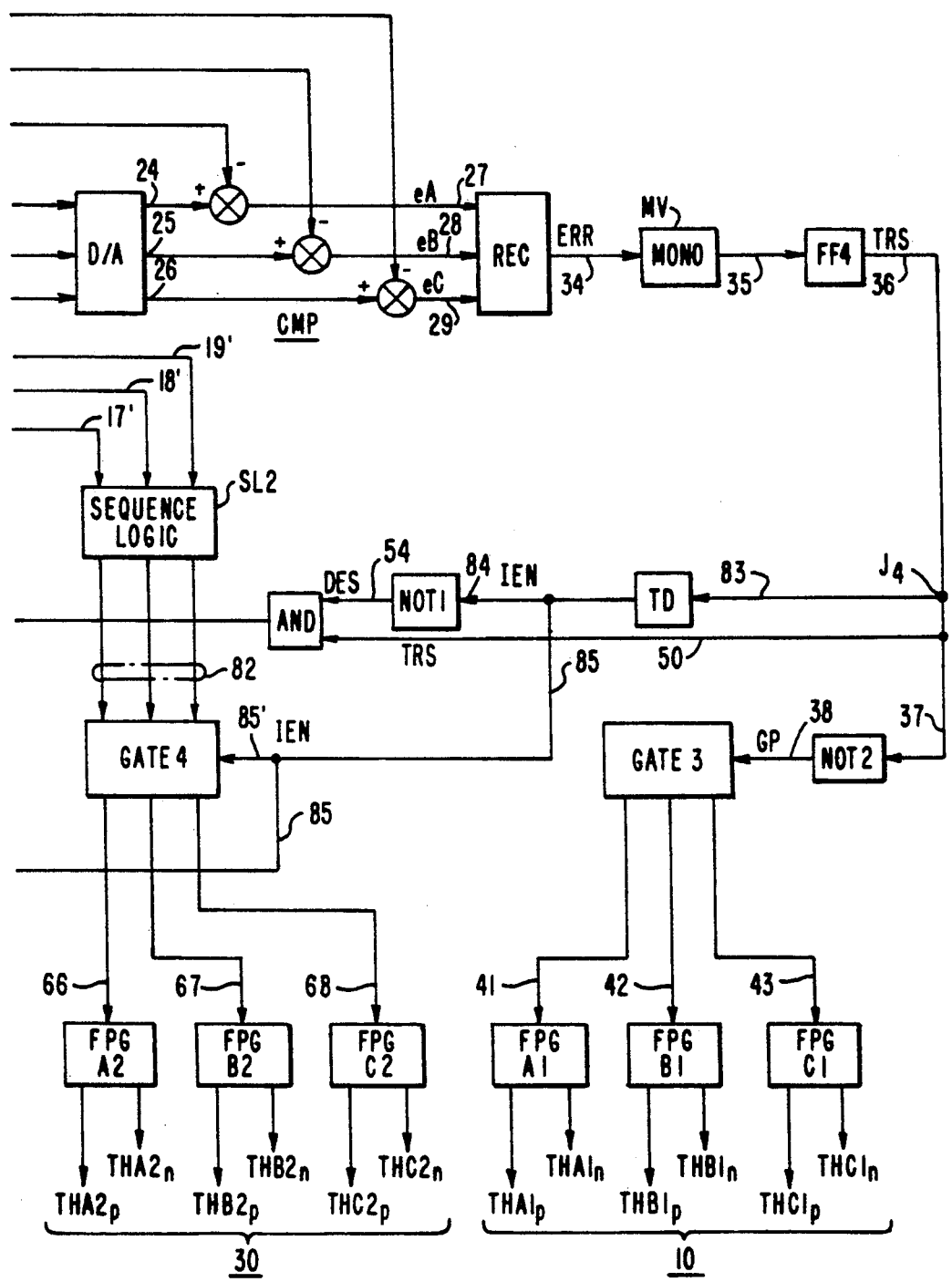

The inverter INV, as generally known, converts the DC voltage V$_{DC}$ of a DC link between terminals at positive and negative polarity (P,N) into AC voltage on respective phases A, B, C which, via reactors LA, LB, LC and lines 1, 2, 3, go to respective nodal points J$_1$, J$_2$, J$_3$ on the respective lines L$_1$, L$_2$, L$_3$ at locations between the generator switch GNS and the load LD. A capacitor CP is, according to the present invention, kept charged under the voltage V$_{DC}$ at the input of the inverter, so that it remains charged when on standby. Each pair of GTO switches in the inverter has a nodal point (J'$_1$ for Phase A, J'$_2$ for phase B, J'$_3$ for phase C) connected with a corresponding one of lines 1, 2 and 3. Each GTO of the inverter has a reactive current diode (DA$_p$, DA$_n$). (DB$_p$, DB$_n$), (DC$_p$, DC$_n$) mounted in antiparallel thereto, as generally known. As explained hereinafter, the GTO switches of the inverter fulfill, according to the invention, two different functions, and are gated differently depending upon the selected function: the normal function of the inverter switches is in a "UPS mode" to generate the AC waveform on lines 1, 2, 3, a waveform which should match in amplitude and frequency the voltages VSA, VSB and VSC from the primary AC source; the second function for the inverter switches, according to the present invention, is in a "commutation mode" to commutate the switches of the generator switch GNS upon load transfer, e.g. when the generator switch GNS is no longer gated and the thyristors thereof have to be turned OFF, before the inverter INV in the UPS mode can take over the function of the primary AC power supply, now interrupted. As explained hereinafter, in the "commutation mode" special gating of the GTO's is provided to apply from the capacitor voltage V$_{DC}$, or DC link voltage, a commutating voltage, via lines 1, 2, 3, onto lines L$_1$, L$_2$, L$_3$ against any of the GNS thyristors which are no longer gated but still under conduction. This will be called hereinafter "natural commutation". It is understood, however, that this approach which is part of the preferred embodiment herein described by reference to FIGS. 4 and 5, is not the only one possible. For instance, instead of thyristors, the generator switch GNS could be comprised of GTO devices with an associated gating circuit providing negative gate pulses to turn OFF the devices when required. Indeed, in such case, there is "forced commutation" and the "natural commutation" step hereabove referred to as taken with the inverter GTO switches and the DC link voltage would be dispensed of.

The harmonic filter FIL is schematized in FIG. 4 by capacitors CAB between phases A and B, CBC between phases B and C, and CCA between phases C and A. These provide a preferred path for the harmonic load currents in lines L$_1$, L$_2$, L$_3$ and attenuate the voltage harmonics generated by the inverter on lines 1, 2 and 3, the bypass being a closed circuit between lines 11, 12, 13 from lines 1, 2 and 3, respectively.

Referring to FIG. 5, the transfer switch controller TSC for the implementation of the gating of the generator switch GNS by lines 10, of the inverter INV by lines 20, and of the filter FIL by line 30 which respectively control the three elements Sg, Si and Sf of the transfer switch TSW of FIG. 3, will be now described in detail.

FIG. 5 shows the derivation on lines 31, 32, 33 of voltage signals VA, VB and VC from the secondary (windings SA, SB, SC) of the transformer TR having a star primary winding (PA, PB, PC). Between lines 4 and 5, selecting phase line C, is derived a reference signal representing the phase of the fundamental phase voltage VC, e.g. derived between the two ends of winding SC. This reference signal is inputted into a phase-locked loop circuit comprising a cross-over detector DET providing on line 6 a synchronized pulse signal. This signal is applied to a phase-locked oscillator PLO outputting on line 7 a pulse train PT. The time interval between pulses corresponds to an angular increment of the AC cycle of the source. This pulse train is in turn applied to a counter CNT which generates on lines 70 a digital address signal for a ROM. Within the ROM are stored as a look-up table the discrete values of the voltage reference which is desired to appear on either of lines $L_1$, $L_2$, $L_3$ to the load. Synchronism of the PLO is maintained by a synchronizing feedback loop SYNC. This phase-locked loop has been described in U.S. Pat. No. 4,028,609 which is hereby incorporated by reference. Therefore, in accordance with the synchronized signal from lines 4, 5, the counter CNT addresses by line 7 the successive values from low peak to high peak which characterizes an ideal voltage curve represented in digital form and reflecting what the primary AC supply should generate in magnitude and frequency. The look-up table readings are derived on lines 14, 15 and 16 for the respective phases. A digital to analog converter D/A provides in analog form on lines 24, 25, 26 the reference phase voltages.

Comparator CMP algebraically combines the signals of lines 31, 32, 33 with those of lines 24, 25, 26 so as to derive on lines 27, 28, 29 error signals eA, eB, eC. The absolute value of the largest of the three line-to-line error signals $e_A$-$e_B$, $e_B$-$e_C$, and $e_C$-$e_A$ derived on lines 27, 28, 29 is outputted on line 34 by rectifier circuit REC. Circuit REC is implemented by a three-phase rectifier bridge having three AC inputs connected to the respective input lines 27, 28 and 29. The largest of the three signals in magnitude is seen from the DC output thereof. Line 34 controls a biased monostable multivibrator MV. When the signal of line 34 exceeds the bias of multivibrator MV, a signal is generated on line 35 at the output thereof to trip a flip-flop FF4. Then flip-flop FF4 will output on line 36 a transfer enable signal TRS. From what precedes, it will appear that whenever the voltage from the primary AC power supply deviates from its original and well defined characteristics, as defined by the stored data of the ROM, provided such deviation is large enough, this will be detected by comparator circuit CMP and rectifier circuit REC, and flip-flop FF4 is set. Therefore, the triggering signal TRS exists on line 36. It is understood that such minimal deviation translates a critical event originating in the primary AC power supply, requiring 1) to open the generator switch GNS and 2) to condition the inverter INV to generate auxiliary AC power at nodal points $J_1$, $J_2$, $J_3$ of the AC load input lines.

To this effect, over junction $J_4$, and via line 37, the signal TRS of line 36 will immediately cause NOT device NOT2 to apply on line 38 a disabling signal for the gating circuit GATE3 of the generator power switch GNS. As a result, the gating pulses of lines 41, 42, 43 to firing pulse generators $FPGA_1$, $FPGB_1$ and $FPGC_1$ will be removed, and the thyristors $THA1_p$ . . . $THC1_n$ will no longer be gated by lines 10.

Figure 6:
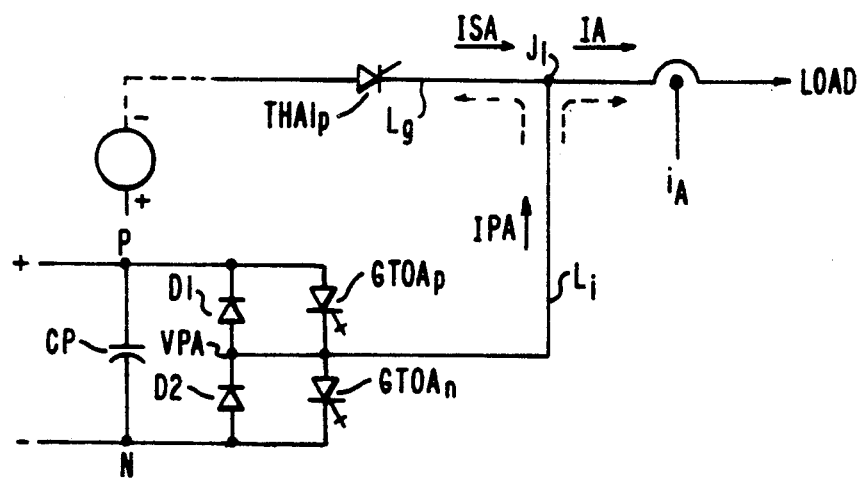
FIG. 6 illustrates, in relation to one thyristor of the generator static switch of the primary AC power supply, the operation of the toggle switches of the inverter when used for applying from the standby source a commutating voltage thereto.

At the same time, from junction $J_4$, by line 50, signal TRS establishes another ONE at the input of an AND device already supplied from NOT circuit NOT1 and line 54 with a ONE. Therefore, the AND device applies on line 55 an enabling signal COM for another gating circuit GATE1 which provides by lines 56, 57, 58 the control pulses for pulse generators $FPGA_3$, $FPGB_3$ and $FPGC_3$ for the three poles of the inverter INV, whereby by lines 20, the GTO switches of the inverter are gated. Such gating of the inverter switches is, according to the invention, such that (referring to FIG. 4) on line 1 (for the first pole), or on line 2 (for the second pole), or on line 3 (for the third pole), the one of the two GTO's in series between the terminals of the filter capacitor CP, i.e. the DC link, a DC voltage of the right polarity is applied on the load side of the generator switch GNS thyristor to turn the same OFF. FIG. 6 shows illustratively for pole A and line 1 thereof that commutation must be with the positive polarity through $GTOA_p$ if at that particular moment thyristor $THA1_p$ is conducting. This polarity is commanded by the direction of current flow through the conducting thyristor at the moment of applying a gate pulse on a corresponding line 20. Referring again to FIG. 5, polarity selection and command are achieved by sensing currents $i_A$, $i_B$, $i_C$ from lines 21, 22, 23 (FIG. 4) and applying the signals so derived to corresponding flip-flops FF1, FF2, FF3 (FIG. 5) from which are derived on lines 51, 52, 53, respectively, signals characterizing the polarity of the flowing current. Therefore, when GATE1 is enabled from line 55, by lines 56, 57, 58, to the firing pulse generators ($FPGA_3$, $FPGB_3$, $FPGC_3$) a corresponding GTO switch of the right polarity ($GTOA_p$ or $GTOA_n$ for pole A; $GTOB_p$ or $GTOB_n$ for pole B; $GTOC_p$ or $GTOC_n$ for pole C) will be commanded for conduction via lines 20. When such a switch is conducting, the appropriate polarity potential (from P, or from N) is applied through a corresponding reactor (LA, LB or LC) to junction $J_1$, $J_2$ or $J_3$.

Figure 7A:
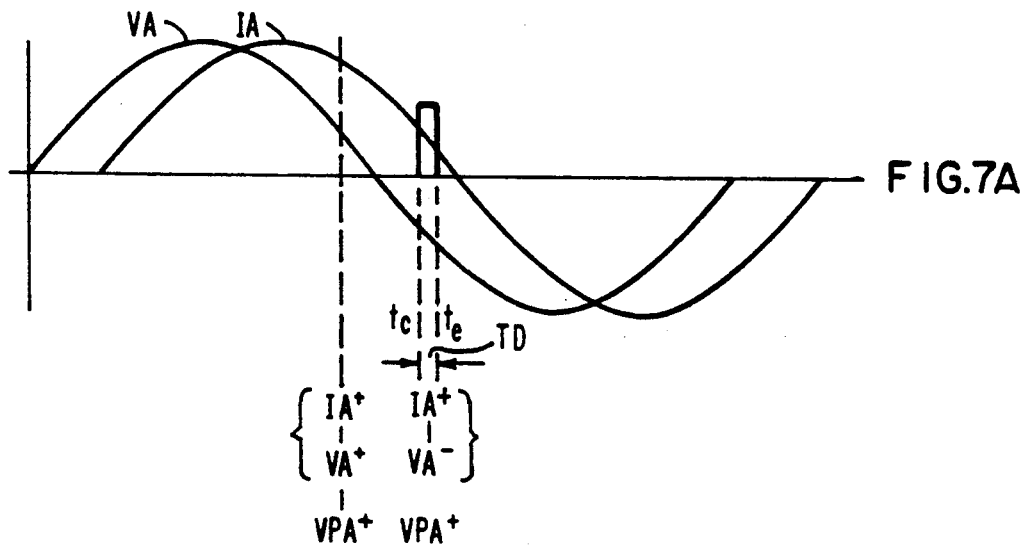
FIGS. 7A and 7B illustrate with curves the commutation process with the circuit of FIG. 6.
Figure 7B:
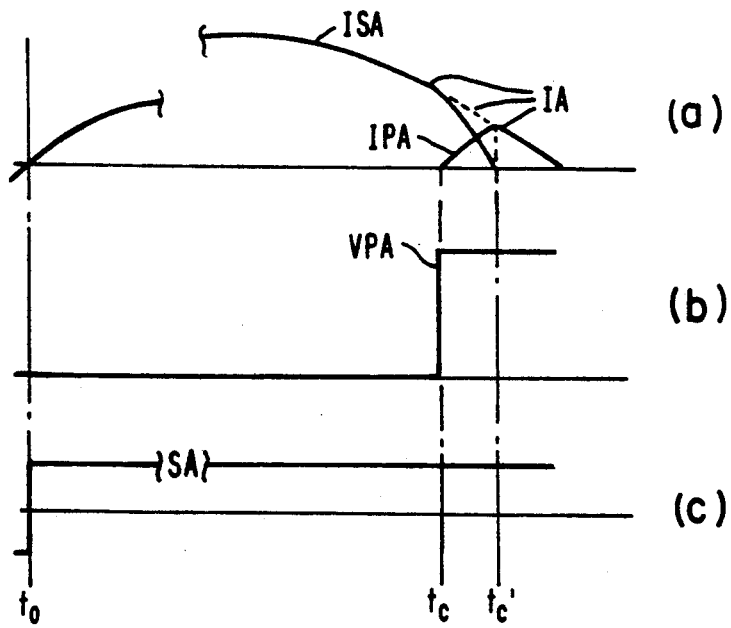

Referring to FIGS. 6 and 7A, 7B the commutation process will be now explained in detail.

FIG. 6 shows for pole A and line 1 thereof that commutation must be with the positive polarity through $GTOA_p$ if at that particular moment thyristor $THA1_p$ is conducting. Curve (a) of FIG. 7A shows the line voltage $V_A$, the line current $I_A$, both positive until zero-crossing of $V_A$. Since the polarity of line current $I_A$ is translated by line 21 to flip-flop FF1 of FIG. 5, after the zero-crossing the signal $i_A$ of line 21 becomes positive, even though after such zero-crossing $V_A$ is negative. At the instant $t_c$ of load transfer, under the effect of commutation control signal COM, line 55 enables GATE1 during a time interval TD and switch $GTOA_p$ is turned ON. As shown by the curves under (a) in FIG. 7B, when the current ISA flowing through thyristor $THA1_p$ tends to decrease, under the applied positive potential VPA=P (curve (b)), a current IPA builds up which partly goes to the load and partly opposes current ISA through the still conducting thyristor $THA1_p$, which will eventually be turned OFF, as shown when ISA=0 at instant $t'_C$ at the end of the commutation. Curve (b) of FIG. 7B shows the commutation potential VPA=P being applied at instant $t_c$ and curve (c) shows the states of flip-flop FF1 (FIG. 5) alternately positive, or negative, with current zero-crossings at times $t_o$.

As shown in FIG. 5 commutation with the three phases of generator switch GNS is assumed to take place within a time delay TD, typically of 100 μs. Accordingly, between instants $t_c$ and $t_e$ (FIG. 7A) a time delay TD is provided to automatically end the commutation mode e.g. control of the inverter in accordance with gating circuit GATE1. As shown in FIG. 5, the time delay is initiated on lines 36, 83 by the triggering pulse TRS (curve k in FIG. 8). After the time delay TD (curve (m) in FIG. 8) has expired, over line 85 another gating circuit GATE2, used for the normal inverter operation that is, in the UPS mode, is enabled by signal IEN (curve (n) in FIG. 8). Therefore, inverter control is effected by lines 76, 77, 78 to the three pulse generators FPGA$_3$, FPGB$_3$ and FPGC$_3$ outputting firing pulses by lines 20 to the GTO's of the inverter. At the same time by line 84, a NOT circuit NOT1 is set so that the AND input DES from line 54 becomes a logic zero, thereby cancelling the enable signal COM of line 55 to the commutation gating circuit GATE1.

A gating circuit GATE4 is provided for applying pulses to the pulse generators FPGA$_2$, FPGB$_2$ and FPGC$_2$ generating firing pulses via lines 30 to the thyristors of the filter FIL.

Referring again to U.S. Pat. No. 4,028,609 which is incorporated by reference, it is known to generate a reference waveform synchronized with the zero-crossings of the main AC power supply in order to control sequentially a gating circuit such as GATE2 or GATE4 in FIG. 5. As shown in the drawings, a sequence logic SL1 for GATE1 and SL2 for GATE4 responds to the digital outputs of the ROM by lines (14, 17), (15, 18) and (16, 19) of SL1, and by lines (14, 17'), (15, 18') and (16, 19') for SL2. Sequence logic SL1 controls by lines 81 GATE2 when the latter is enabled by line 85, and sequence logic SL2 controls by lines 82 GATE4 when the latter is enabled by line 85'.

Figure 8:
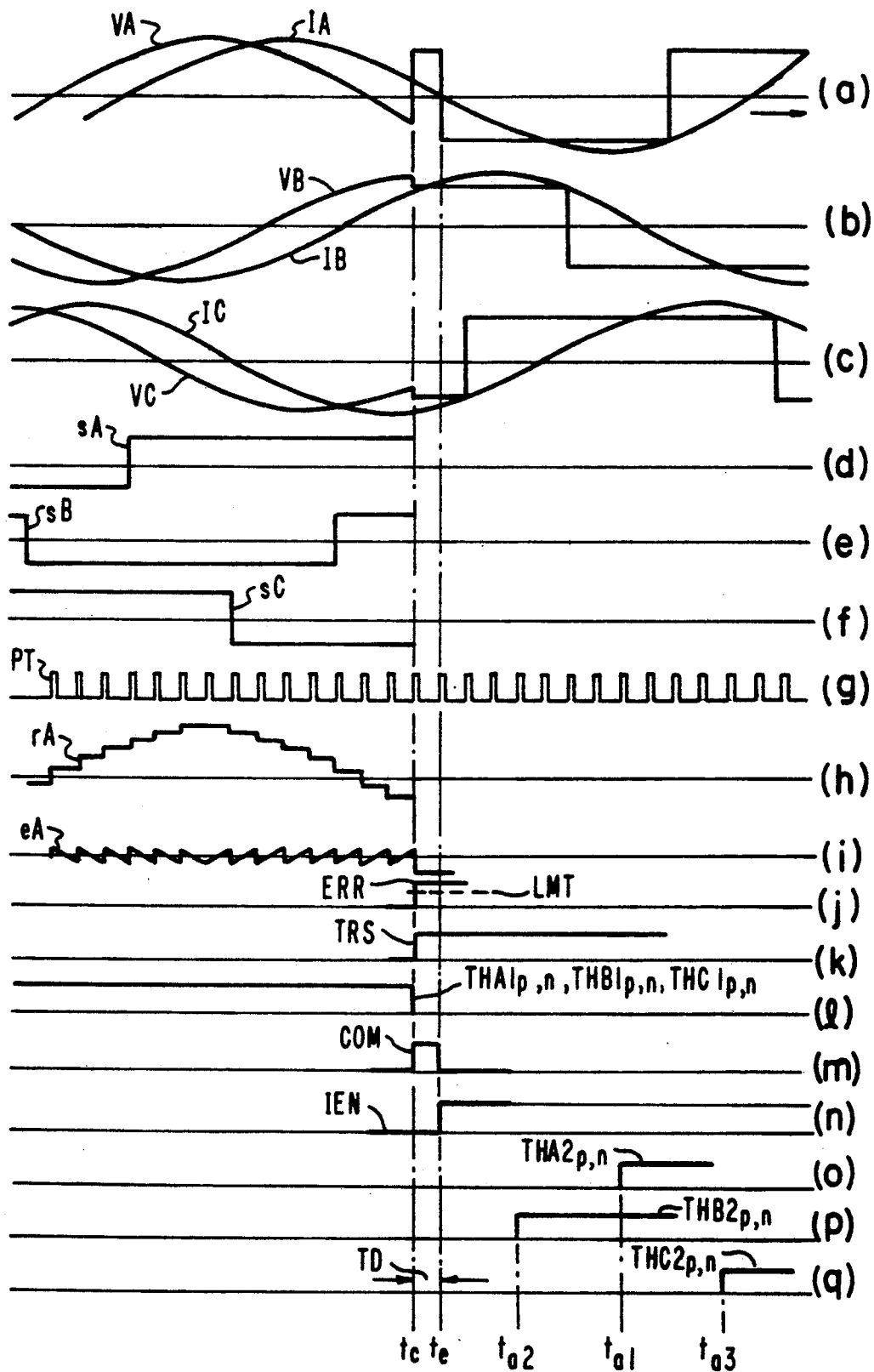
FIG. 8 is a set of curves illustrating the operation of the circuit of FIG. 5.

Referring to FIG. 8, the operative steps of the circuits of FIGS. 4 and 5 are illustrated with curves. Curves (a) are signals representative of the voltage VA and current IA for line L1. Curves (b) and (c) are curves like curves VA, IA under (a), for VB, IB and VC, IC, on lines L2 and L3, respectively. Curves (d), (e) and (f) are for the outputs of flip-flop FF1, FF2, FF3, thus, exhibiting a change of polarity for each current zero-crossing. Curve (g) show the pulse train PT outputted by the phase-locked oscillator PLO, thus on line 6 counter CNT. As addressed digitally by counter CNT, the ROM outputs digital signals representing successive levels of segments of the stored reference output voltage, for instance, as shown by curve (h) for phase A. Curve (i) is the output of comparator CMP for phase A. Curve (j) is the maximum error detected by circuit REC, and the bias for generating a signal on line 35 is shown to be defined by a limit LMT. Curve (k) is the signal TRS of line 36, outputted by flip-flop FF4. Curve (l) shows when the thyristors of the generator switch GNS cease to be gated, namely from instant $t_c$, at the beginning of the delay TD, to instant $t_e$ when delay TD has expired, that is when the substituted operation with the inverter in the UPS mode has become effective. Thereafter, if necessary, normal operation with the primary AC source can be resumed. In this regard, curve (m) shows the signal COM of line 55 enabling the gating circuit GATE1 of the inverter whereas, after the delay TD ($t_c$-$t_e$) has expired, curve (n) shows signal IEN characterizing the end of commutation and normal inverter operation effective in the UPS mode. At the same time, curves (o), (p) and (q) show the gating periods (determined from lines 66, 67, 68 of FIG. 5) of the line-to-line thyristors (THA2$_p$, THA2$_n$), (THB2$_p$, THB2$_n$) and (THC2$_p$, THC2$_n$) for filter FIL. Curves (o), (p), (q) show that gating occurs at delayed instants $t_{a1}$, $t_{a2}$, $t_{a3}$ respectively for the respective pairs of thyristors.

As explained by reference to FIGS. 2C, 2D and 2E, in the "static standby mode" the inverter INV is deenergized and, therefore, not gated, but the required DC link voltage from filter capacitor CP at the input thereof is present at all times. In this respect, referring to FIG. 4, it is observed that, while inverter switches GTOA$_p$-GTOC$_n$ during standby are not gated (GATE1 and GATE2 disabled by lines 55 and 85, respectively) and are open, filter capacitor CP of the DC link is under charge through antiparallel diodes DA$_p$-DC$_n$ and the respective lines 1, 2, 3 fed from the primary AC power lines L$_1$, L$_2$, L$_3$. Therefore, at the instant load transfer is required and the generator switch GNS (by lines 10 and NOT2 device associated with GATE3 of FIG. 5) is no longer gated, the steps leading to the UPS mode can be initiated with a DC link voltage already operational.

Figure 9:
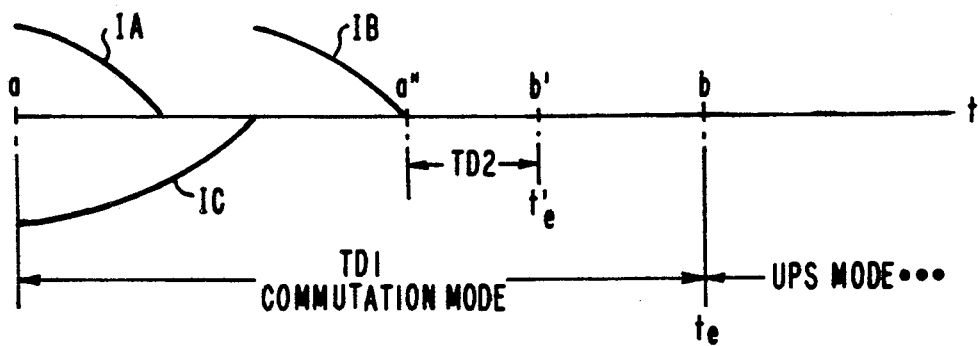
FIG. 9 illustrates with curves two different approaches for effecting transfer according to the present invention from the commutation mode to the UPS mode.

Referring to FIGS. 9 and 5, from the instant of load transfer $t_c$ (triggered by signal TRS of line 36 after flip-flop FF4 has been set for the commutation mode of operation) a time interval determined by time delay device TD is set by line 83 to lapse, before disabling by lines 54 and 55 the commutation mode gating circuit GATE1 and enabling by line 85 the UPS mode gating circuit GATE2. As shown in FIG. 9, such time interval TD1 is chosen to be long enough so that when it expires at time $t_e$ the three currents IA, IB and IC flowing through generator switch GNS have had time to be all reduced to zero under the commutation process. According to the present invention, an alternative approach is to detect when all three currents IA, IB and IC have decreased to zero and from such event to establish a time delay TD2, as shown in dotted lines in FIG. 9. With this approach, the time delay TD2 which is a conservative device to be able to start operation in the UPS mode at b', is initiated with more knowledge regarding an effective commutation process and can be much smaller, so that instant $t'_e$ can occur earlier than $t_e$ under the first approach.

Figure 10:
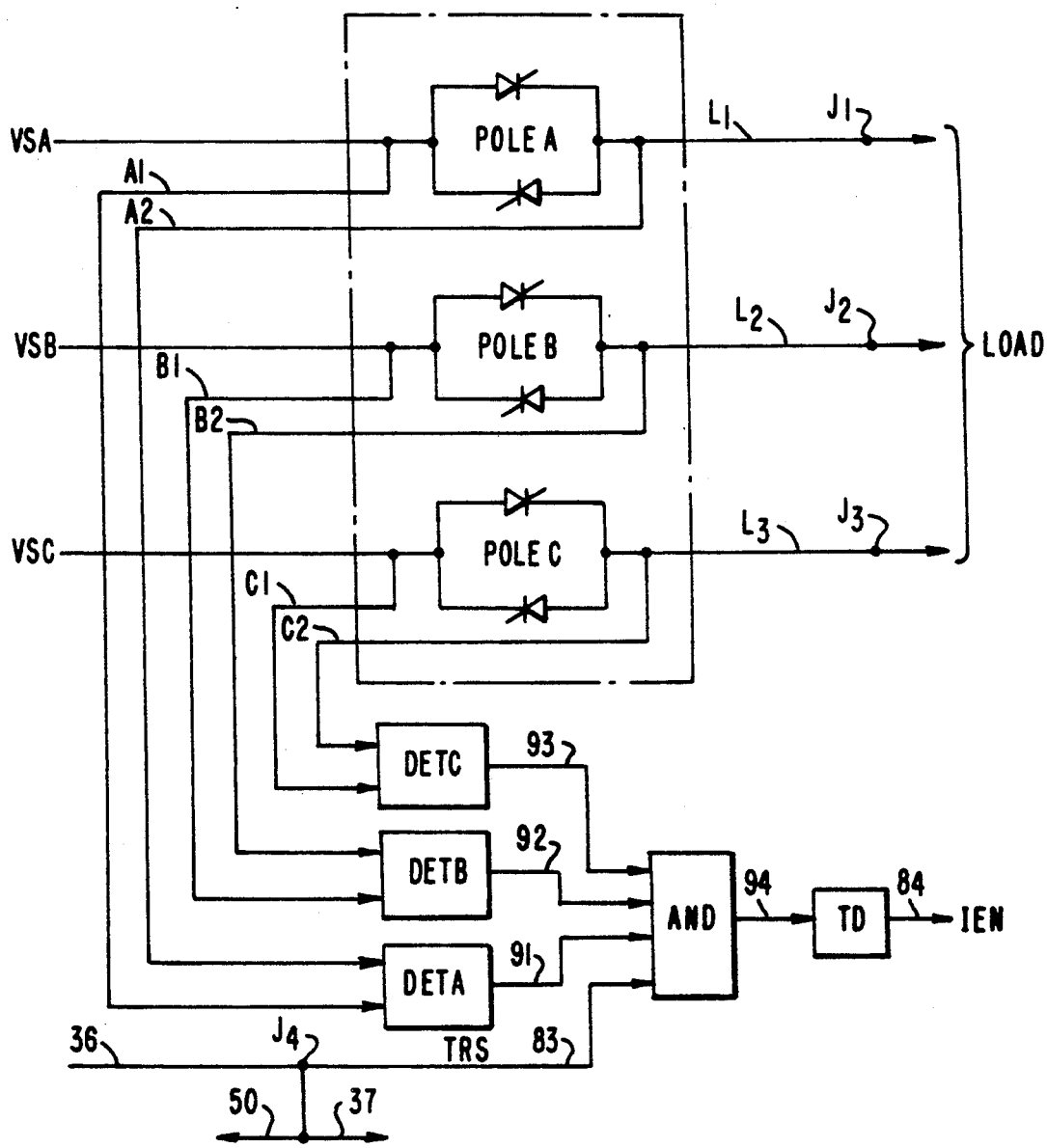
FIG. 10 is a block diagram complementary to FIG. 5 illustrating one implementation of the second approach of FIG. 9.

FIG. 10 shows an implementation of the second approach. The voltage drop across the power switch of the generator switch GNS being under commutation is measured by lines (A1, A2), (B1, B2) and (C1, C2) for each pole. At the moment the corresponding power switch ceases to conduct, there is a transition in the voltage drop to a substantial magnitude for the open switch. This event is detected by detectors DETA, DETB and DETC for the three poles A, B, C. The outputted critical signals on lines 91, 92, 93, respectively are added by an AND device already responsive to the triggering signal TRS of line 83 from junction J4. Therefore AND device will by line 94 trigger the time delay device TD, which in this instance has a time delay TD2 much smaller than in the instance of FIG. 5, which otherwise remains unaltered.

With regard to the harmonic filter gating circuit GATE4, the following comments are in order.

As earlier stated, by reference to FIG. 2E, once in the UPS mode with GATE2 for the inverter, in order to avoid filter inrush switching of the harmonic filter may have to be delayed somewhat, i.e. by delaying the energization of GATE4, as illustrated by instants $t_{a1}$, $t_{a2}$, $t_{a3}$ on the respective gating curves (o), (p), (q) of FIG. 8. Such delay, for each line-to-line voltage, i.e. for each gating portion (within GATE4 of FIG. 5) generating a corresponding gating signal (66, 67, 68 in FIG. 5), is either 1) until the first occurrence of a zero-crossing once the UPS mode has become effective, or 2) until the harmonic filter capacitors CAB, CBC and CCA are charged to peak line-to-line votlage. In the first instant it might take 120°, in the second instant it might last 240°. This is easily implemented from the ROM device, via sequence logic SL2 and control lines 82. A detector is easily associated with lines 82 to detect when, after instant $t_e$ (e.g. device TD is reset) a zero-crossing with the digital outputs of the ROM occurs or peak value is reached by the voltage reference outputted by the ROM. Such detection, concurrently with the enable signal of line 85', will enable GATE4.

I claim:

1. A UPS system including: a primary AC power supply connected to an AC load through a first static-controlled transfer switch, an auxiliary inverter and a standby DC voltage-source connected to said inverter, a second static-controlled transfer switch for connecting said inverter to said AC load, and means responsive to a critical event for disabling said first transfer switch and for enabling said second transfer switch;

the inverter comprising gating means operative first in a commutation mode concurrently with said critical event responsive means for applying, through said inverter and through said second transfer switch, to said first transfer switch the voltage of said DC-source as a commutation voltage thereof;

said inverter gating means being operative in a UPS mode after said commutation mode to generate an auxiliary AC power supply to the AC load.

2. The UPS system of claim 1 with time delay means being provided for establishing a predetermined time delay for the duration of said commutation mode and for the initiation of said UPS mode.

3. The UPS system of claim 2, with means being provided for sensing the direction of current in said first transfer switch; said gating means being responsive to said sensing means for outputting with said inverter a commutation voltage of a polarity corresponding to the sensed current direction.

4. The UPS system of claim 3, with the inverter having power switches, said gating means being operated in the commutation mode to control selected ones of said inverter power switches, the selection of said selected inverter power switches being in accordance with the current direction sensed by said sensing means and corresponding to said commutation voltage polarity.

5. The UPS system of claim 4, with said second transfer switch comprising said selected inverter power switches under control of said gating means in the commutation mode.

6. The UPS system of claim 5, with said inverter power switches being GTO's switches.

7. The UPS system of claim 5, with said inverter power switches being transistors.

8. The UPS system of claim 5, with said first transfer switch including thyristor switches.

9. The UPS system of claim 8, with means synchronized with said primary AC power supply for generating a reference voltage signal characterizing said AC load, said gating means in the UPS mode being responsive to said reference voltage signal for controlling said inverter to generate said auxiliary AC power supply.

10. The UPS system of claim 9, with means for sensing actual AC voltage at the input of said AC load for deriving a signal representative of said actual AC voltage, comparator means being provided responsive to said actual voltage representative signal and to said reference signal for detecting said critical event.

11. The UPS system of claim 10, with said predetermined time delay being initiated from a zero-current condition detected in said first transfer switch.

12. The UPS system of claim 11, with means associated with the power switches of said first transfer switch for sensing the respective voltage drops thereacross, thereby to provide an indication of said zero-current condition upon a transition in said voltage drop occurring concurrently and for all power switches thereof.

13. The UPS system of claim 12 with static controlled harmonic filtering means operatively connected at the output of said inverter through corresponding power switches controlled concurrently with said gating means being in the UPS mode.

14. The UPS system of claim 13, with harmonic filter gating means being provided for said filtering means for gating the corresponding power switches in a filtering mode after said predetermined delay.

15. The UPS system of claim 13, with said filtering means corresponding power switches being gated after said time delay and concurrently with voltage zero-crossing occurring at a location between said first transfer switch and said AC load.

16. The UPS system of claim 15, with said harmonic filtering means having capacitor means precharged at one of the voltage peak values of said AC power supply; said gating means being enabled following said predetermined delay by the first voltage peak of the same polarity as said precharged capacitor means voltage.

* * * * *